(12) United States Patent
Deppe et al.

(10) Patent No.: US 6,676,731 B1
(45) Date of Patent: Jan. 13, 2004

(54) METHOD OF CHARGING A PRESSURIZED CONTAINER WITH GRANULAR SOLIDS

(75) Inventors: Rüdiger Deppe, Frankfurt am Main (DE); Klaus Kanschik, Essen (DE); Andreas Orth, Friedrichsdorf (DE)

(73) Assignee: MG Technologies AG, Frankfurt am Main (DE)

( * ) Notice: Subject to any disclaimer, the term of this patent is extended or adjusted under 35 U.S.C. 154(b) by 0 days.

(21) Appl. No.: 09/807,749
(22) PCT Filed: Apr. 29, 2000
(86) PCT No.: PCT/EP00/03895
  § 371 (c)(1),
  (2), (4) Date: Aug. 8, 2001
(87) PCT Pub. No.: WO01/29496
  PCT Pub. Date: Apr. 26, 2001

(30) Foreign Application Priority Data

Oct. 18, 1999 (DE) .......................... 199 50 101

(51) Int. Cl.$^7$ ............................................. C21B 13/00
(52) U.S. Cl. ........................................... 75/414; 75/490
(58) Field of Search ................... 75/490, 414

(56) References Cited

U.S. PATENT DOCUMENTS 3,710,808 A * 1/1973 Celada et al. ................. 75/490

* cited by examiner

*Primary Examiner*—Melvyn Andrews
(74) *Attorney, Agent, or Firm*—Herbert Dubno

(57) ABSTRACT

The solids will first of all reach a first container under atmospheric pressure and then reach a second container of variable pressure, which is disposed thereunder, before they are introduced into the pressure vessel. The first and the second container each have a lower outlet passage and a movable shutter cooperating with the outlet passage. The outlet end of the outlet passage is disposed 20 to 400 mm above the shutter in the closed position, in the closed position the shutter forms the bottom of a chamber at least partly filled with solids. The chamber is connected with the outlet passage in a gastight way, and there is no gastightness between the chamber and the shutter. In the closed position, the shutter carries a solid bed, a vertical solid column having a height of at least 1 m is present in the outlet passage and in the container. In the closed position, seal gas is pressed into the chamber and into the solid column from the outside.

6 Claims, 1 Drawing Sheet

METHOD OF CHARGING A PRESSURIZED CONTAINER WITH GRANULAR SOLIDS

CROSS REFERENCE TO RELATED APPLICATIONS

This application is a national stage of PCT/EP00/03895 filed Apr. 29, 2000 and is based upon German national application 199 50 101.7 of Oct. 18, 1999 under the International Convention.

FIELD OF THE INVENTION

This invention relates to a process of introducing granular solids into a pressure vessel under a pressure of at least 2 bar, wherein the solids first of all reach a first container under atmospheric pressure and then a second container of variable pressure, which is disposed thereunder, before they are introduced into the pressure vessel, and wherein the first and the second container each have a lower outlet passage and a movable shutter cooperating with the outlet passage.

BACKGROUND OF THE INVENTION

Sluice devices of this kind, which employ movable shutters, are known and described for instance in U.S. Pat. No. 5,584,970. In these devices, however, small amounts of gas always flow from the pressure vessel to the container under atmospheric pressure and from there into the atmosphere, which in certain cases can be very disadvantageous.

OBJECT OF THE INVENTION

It is therefore the object underlying the invention to design the above-mentioned process such that without a significant wear solids can be introduced into the pressure vessel without gases reaching the atmosphere countercurrently with respect to the solids.

SUMMARY OF THE INVENTION

In accordance with the invention this object is attained in that the outlet end of the outlet passage is 20 to 400 mm above the shutter in the closed position, that in the closed position the shutter forms the bottom of a chamber at least partly filled with solids, that the chamber is connected with the outlet passage in a gastight way and there is no gastightness between the chamber and the shutter, that in the closed position the shutter carries a solid bed and a vertical solid column having a height of at least 1 m is present in the outlet passage and in the container, and that in the closed position seal gas is pressed into the chamber and into the solid column from the outside. This locking process is particularly useful for hot solids, which are introduced into the first container for instance with temperatures in the range from 300 to 1300° C.

Expediently, the shutter and at least in part also the chamber are disposed in a shutter housing which includes the solids inlet for the container disposed thereunder.

It is usually ensured that in the closed position the solid bed in the chamber has a minimum height of 5 mm, so that the area between the edge of the chamber and the shutter becomes largely impermeable to gas.

The pressure in the pressure vessel preferably lies in the range from 3 to 20 bar. The gas in the pressure vessel may be of completely different kinds, it may for instance have a toxic effect or it may consist of hydrogen for at least 50 vol-%, so that it must be prevented from coming in contact with the oxygen of the air.

BRIEF DESCRIPTION OF THE DRAWING

Embodiments of the process will be explained with reference to the drawing, wherein.

SPECIFIC DESCRIPTION

Figure 1:
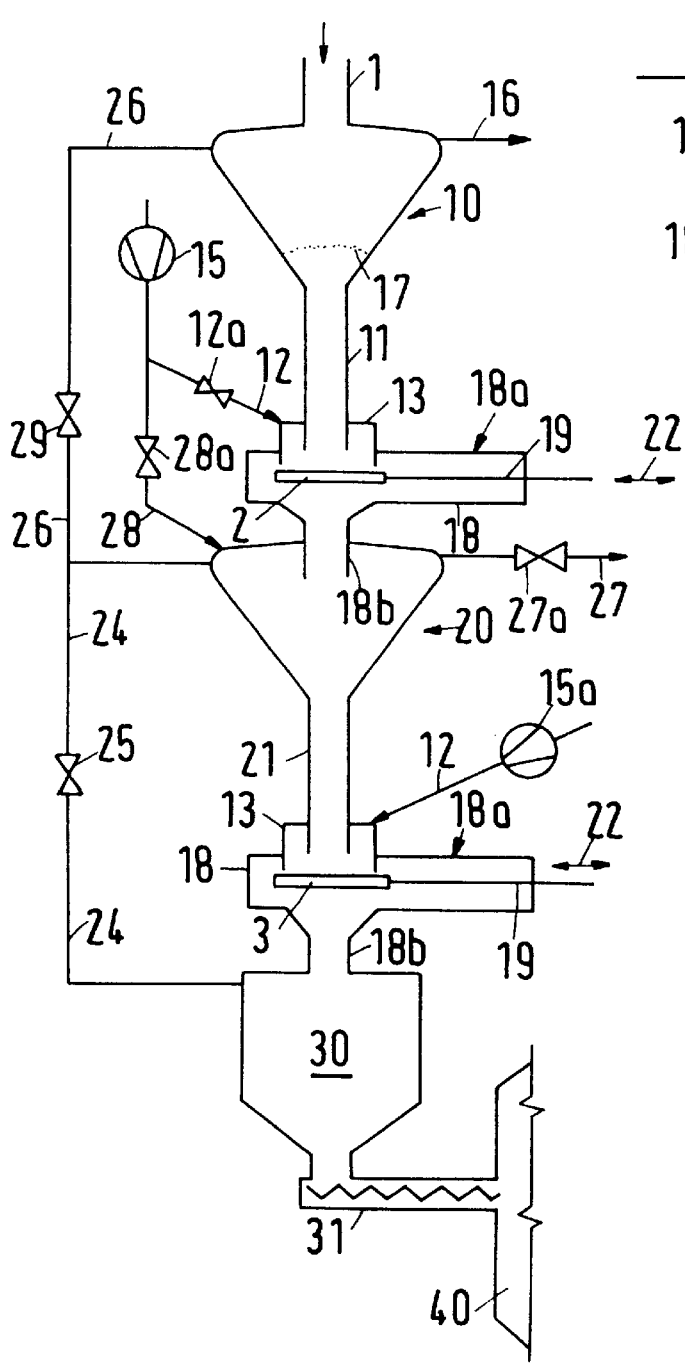
FIG. 1 shows the schematic flow diagram of the process.

As shown in FIG. 1, granular free-flowing solids are introduced continuously or discontinuously from the top through the inlet 1 into the first container 10, from where they fall into the second container 20 when the shutter 2 is open. When the shutter 3 is open, the solids will first of all fall into a storage bin 30, which has the same excess pressure as a subsequent reactor 40 which is only represented in part. With the bin 30 it is possible that solids discontinuously introduced into the bin 30 from the top can continuously be introduced into the reactor 40 by means of a conveying screw 31 due to the solids reservoir in the bin 30. The pressure in the bin 30 and in the reactor 40 is at least 2 bar and usually 3 to 20 bar, but it may be even higher.

The second container 20 has a variable pressure, which may be adjusted as required to the atmospheric pressure of the first container 10 or to the pressure in the container 30. The necessary sealing between two containers of different pressure is explained with reference to FIG. 2. A horizontally movable shutter 2, the outlet end of an outlet passage 11 belonging to the container 10, a solid bed 14 and a seal gas supplied through line 12 cooperate with each other. In the closed position represented in FIG. 2, the shutter 2 forms the bottom of the downwardly open chamber 13 which is disposed above the same. Between the bottom edge of the chamber 13 and the shutter 2 there is a small distance, usually in the range between 0.2 and 2 mm, so that the shutter 2 can be reciprocated without touching the chamber 13. The solid bed 14 on the shutter has a minimum height of 5 mm, so that it usually covers the gap between the edge of the chamber and the shutter 2. The vertical distance between the outlet end of the passage 11 and the shutter 2 in the closed position expediently is 20 to 400 mm and preferably at least 40 mm. The lid portion 13a of the chamber 13 is connected with the outlet passage 11 in a gastight way. Line 12 opens in the lid portion, which line is used for supplying seal gas, e.g. nitrogen or $CO_2$, which by means of a compressor 15 (cf. FIG. 1) is spaced from the outside through the open valve 12a into the chamber 13. By means of this seal gas the pressure in the chamber 13 is adjusted to approximately the pressure as it exists in the container 20 disposed thereunder.

Since atmospheric pressure exists in the upper portion of the container 10, which is partly filled with solids, seal gas flows from line 12 through the chamber 13 and the solid bed 14 into the solid column disposed in the outlet passage 11 and from there upwards through the solids contained in the container 10 and leaves the container 10 through a vent line 16. To restrict this flow of seal gas, it is important that the height of the solid column in the outlet passage 11 and in the container 10 is at least 1 m and usually at least 2 m. The necessary height of the solid column depends on the pressure difference between the chamber 13 and the upper portion of the container 10. During the operation of the sluice device it must be ensured that a certain minimum height of the solid column is maintained. In the individual case, this minimum height will be determined by a test run. It may also be recommendable to always hold the solid column up to the expanding part of the container 10, as is indicated in FIG. 1 by the dotted line 17. By expanding the horizontal cross-section in this area, the flow rate of the seal gas flowing upwards is reduced and a fluidization is thus prevented. This improves the sealing effect of the solid column.

Figure 2:
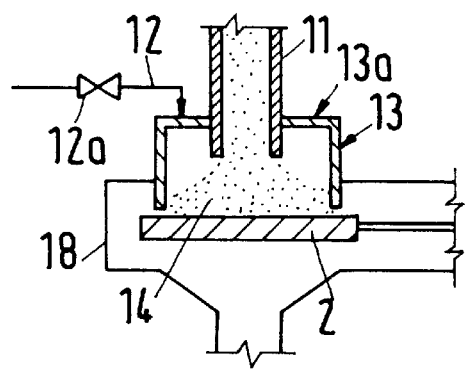
FIG. 2 shows the sealing between two containers with different pressure.

What has been explained with reference to FIG. 2 concerning the sealing between the first container 10 and the second container 20 disposed thereunder is likewise true for the seal between the second container 20 and the storage bin 30 with the shutter 3 provided there. Both the shutter 2 and the shutter 3 are disposed in a shutter housing 18, whose lid portion 18a is connected with the chamber 13 in a gastight way, and which has a solids inlet 18b for the container disposed thereunder. The respective shutter 2 or 3 can be reciprocated horizontally by means of a rod 19 which in a sealed manner extends through the housing 18, as is indicated by the double-headed arrow 22. For the sealing between the housing 18 and the rod 19 a stuffing box may for instance be used.

The chamber 13 belonging to the shutter 3 likewise has a seal gas line 12 with associated compressor 15a. Between the bin 30 and the container 20 disposed above the same a pressure compensation line 24 with a valve 25 is provided, and to the line 24 a further pressure compensation line 26 with a valve 29 is attached, which effects the pressure compensation between the containers 10 and 20. The second container 20 is provided with a lockable vent line 27.

Granular solids are transferred from the inlet opening 1 into the bin 30 as follows, and it is assumed that the bin already contains a certain amount of solids, that the shutter 3 is in the closed position (cf. FIG. 1), that in the vicinity of its outlet passage 21 the container 20 contains a solid column having a height of at least 1 m, that seal gas coming from the compressor 15a flows into the chamber 13 through line 12 and flows upwards through the solid column in the passage 21 before it leaves the container 20 through the open line 27. At this moment, the pressure in the container 20 is 1 bar and is equal to the pressure in the container 10, the shutter 2 is open, and solids from the first container 10 flow into the second container 20. When the solid charge in the container 20 has reached the desired height, the shutter 2 disposed above the same is closed and the container 10 is largely filled with solids. When the solid column in the passage 11 and in the container 10 has reached the necessary height, seal gas is forced by the compressor 15 through line 12 into the chamber 13 and at the same time also through line 28 and the open valve 28a into the container 20. The valve 27a of the vent line 27 and also the valve 29 of the pressure compensation line 26 are closed. When the pressure in the container 20 has reached the pressure in the bin 30, the shutter 3 can be opened, and at the same time the valve 25 is opened in order to effect a pressure compensation between the bin 30 and the container 20. When the desired amount of solids has flown into the bin 30, the shutter 3 is closed again and the pressure in the container 20 is again reduced to atmospheric pressure, with the air-relief valve 27a being opened. During this time, seal gas is continuously supplied through the compressor 15a and the line 12 into the chamber 13 and into the solid column of the outlet passage 21. The locking process can now be continued periodically.

EXAMPLE

Through the sluice device in accordance with the drawing and the associated description, 200 t/h hot iron ore with a particle-size range between 0 and 2 mm and a temperature of 850° C. are fed into a reduction reactor 40 in which a pressure of 40 bar exists. The containers 10 and 20 each have a capacity of 9 m³, their outlet passages 11 and 21 each have a length of 2 m, and they each have a diameter of 400 mm. In each outlet passage with the associated container 10 or 20 a minimum height of the solid column of 3 m is ensured. The distance between the shutter 2 and the outlet end of the passage 11 is 100 mm, and the minimum height of the solid bed on the shutter 2 is 20 mm; the same is true for the container 10 with its outlet passage 21 and the associated shutter 3. Nitrogen is used as seal gas, which is introduced into the chamber 13 with a pressure of 4.4 bar, when the same should have a sealing effect. The containers 10 and 20 are provided with level indicators known per se. Within 5 minutes, 8 m hot iron ore are passed through the two containers 10 and 20 into the bin 30.

Apart from the ore reservoir, the bin 30 contains a hot gas mixture of 80 vol-% hydrogen, 12 vol-% steam and 8 vol-% nitrogen, which temporarily also flows into the container 20. Prior to filling the container 20, the same is therefore rendered inert by rinsing with nitrogen, the valve 27a being closed and the valve 29 being open.

We claim:

1. A process for transferring granular solids into a pressure vessel at a pressure of at least 2 bar which comprises the steps of:

a) delivering said solids to a first container under atmospheric pressure;

b) feeding solids from said first container through a first column to a lower outlet located above a second container at a variable pressure;

c) delivering said solids from said second container through a second column to said pressure vessel below said second container at an outlet from said second column;

d) selectively closing said outlets with respective movable shutters located 20 to 400 mm below the respective outlets;

e) providing the shutters at the bottoms of respective chambers at least partly filled with said solids whereby each shutter carries a bed of said solids and said solids fill the respective said columns each to a height of at least 1 m, each of said shutters being free from gas-tight engagement with the respective chamber; and f) supplying a sealing gas under pressure to the respective chamber from an exterior thereof and into the respective column of said granular solids.

2. The process as defined in claim 1 wherein each shutter and at least in part the respective chamber are disposed in a respective shutter housing having a solids inlet for a respective one of said containers disposed beneath the respective shutter.

3. The process as defined in claim 1 wherein the solid bed in each chamber has a minimum height of 5 mm.

4. The process as defined in claim 1 wherein the pressure in said pressure vessel is 3 to 20 bar.

5. The process as defined in claim 1 wherein a gas in said pressure vessel contains at least 50 volume % hydrogen.

6. The process as defined in claim 1 wherein the solids delivered to said first container are at a temperature in the range of 300 to 130° C.

* * * * *